US008799205B2

(12) United States Patent
Shetty et al.

(10) Patent No.: US 8,799,205 B2
(45) Date of Patent: Aug. 5, 2014

(54) SYSTEMS AND METHODS FOR VIRTUAL SUB-METERING

(75) Inventors: Pradeep Shetty, Karnataka (IN); Rangesa Arakere, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1093 days.

(21) Appl. No.: 12/796,304

(22) Filed: Jun. 8, 2010

(65) Prior Publication Data

US 2011/0302125 A1 Dec. 8, 2011

(51) Int. Cl.
*G06N 5/00* (2006.01)

(52) U.S. Cl.
USPC .................. 706/52; 702/61; 702/62; 219/494

(58) Field of Classification Search
USPC ........................................................... 706/52
See application file for complete search history.

(56) References Cited

U.S. PATENT DOCUMENTS

| | | | |
|---|---|---|---|
| 4,858,141 | A | 8/1989 | Hart et al. |
| 6,094,622 | A | 7/2000 | Hubbard et al. |
| 6,148,623 | A | 11/2000 | Park et al. |
| 6,374,188 | B1 | 4/2002 | Hubbard et al. |
| 6,507,794 | B1 | 1/2003 | Hubbard et al. |
| 7,254,497 | B2 | 8/2007 | Downey et al. |
| 2009/0228320 | A1 * | 9/2009 | Lopez et al. ...................... 705/8 |
| 2010/0305889 | A1 * | 12/2010 | Tomlinson et al. ............. 702/62 |
| 2010/0312874 | A1 * | 12/2010 | Jansen et al. .................. 709/224 |

FOREIGN PATENT DOCUMENTS

EP 2026299 A1 2/2009

OTHER PUBLICATIONS

European Application Serial No. 11168523.6, Response filed Sep. 7, 2012 to Office Action mailed May 16, 2012, 9 pgs.
European Application Serial No. 11168523.6, Office Action mailed May 16, 2012, 5 pgs.
European Application Serial No. 11168523.6, European Search Report mailed Jan. 31, 2012, 4 pgs.
Bijker, A. J., et al., "Active Power Residential Non-intrusive Appliance Load Monitoring System", *IEEE AFRICON 2009*, (Sep. 23 -25, 2009, Nairobi, Kenya), (2009), 1-6.
Simon, J. L., et al., "Load Signature Study—Part II: Disaggregation Framework, Simulation, and Applications", *IEEE Transactions on Power Delivery*, vol. 25, No. 2, (2010), 561-567.

* cited by examiner

*Primary Examiner* — Jeffrey A Gaffin
*Assistant Examiner* — Kalpana Bharadwaj
(74) *Attorney, Agent, or Firm* — Schwegman, Lundberg & Woessner, P.A.

(57) ABSTRACT

The present inventors devised, among other things, systems and methods for estimating the energy usage of individual appliances based on cumulative household energy usage data and energy consumption profiles of the appliances. One exemplary system receives cumulative or aggregate energy usage for a building or other structure including a set of two or more appliances having different load ratings. Based on the aggregate energy usage and predefined usage profiles for the appliances, the exemplary system estimates individual energy usage of the appliances. In one embodiment, the system estimates individual energy usage of the appliances using a Bayesian estimator and displays the usage estimates, referred to as virtual submeter readings, on a graphical user interface.

15 Claims, 2 Drawing Sheets

SYSTEMS AND METHODS FOR VIRTUAL SUB-METERING

TECHNICAL FIELD

Various embodiments of the present inventions concern indirect or virtual measurement of electrical energy usage.

BACKGROUND

Recent years have seen an ever increasing interest in energy conservation. Within this field, one problem that the present inventors have recognized is the problem of helping users of individual appliances and other pieces of equipment understand the energy consumption of these appliances and thus more intelligently target their conservation efforts. Although one could couple an energy meter to each appliance to measure its energy usage, the number of appliances in typical homes and businesses multiplied by the cost of these meters has deterred widespread usage.

Accordingly, the present inventors have recognized a need for better ways of measuring energy usage of individual appliances.

SUMMARY

To address this and/or other problems, the present inventors devised, among other things, systems and methods for estimating the energy usage of individual appliances based on cumulative household energy usage data and energy consumption profiles of the appliances. One exemplary system receives cumulative or aggregate energy usage for a building or other structure including a set of two or more appliances having different load ratings. Based on the aggregate energy usage and predefined usage profiles for the appliances, the exemplary system estimates individual energy usage of the appliances. In one embodiment, the system estimates individual energy usage of the appliances using a Bayesian estimator and displays the usage estimates, referred to a virtual submeter readings, on a graphical user interface.

DETAILED DESCRIPTION OF THE EXEMPLARY EMBODIMENT(S)

This document, which incorporates the drawings and the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Overview

An exemplary virtual or non-intrusive submetering system and method is disclosed. The exemplary system incorporates a dynamic system model that fuses multivariate energy information from at least two appliances or pieces of equipment coupled to a single energy measurement device and deduces electrical activity of the two appliances using a Bayesian estimation procedure. The exemplary system may receive cumulative energy readings from single or minimum number of energy meters. In a commercial building or industrial scenario, the exemplary system receives energy consumption readings from multiple energy meters for non-intrusive sub-metering applications. The exemplary Bayesian estimation procedure takes into account cumulative energy measurement data from the energy measurement device and appliance profile information for each of the appliance. Exemplary appliance profile information includes:
  a. Appliance Load Ratings
  b. Appliance mode dependencies
  c. Interdependency of appliances/Hierarchical structure
  d. User priority
  e. Occupancy
  f. Day of week
  g. Weather conditions Additionally, some embodiments include an auto-configuring function for understanding a home or building environment and retuning system parameters, as well as a change detection function for detecting the building changes, such as addition or deletion of electrical loads.

Exemplary Virtual Sub-Metering System

Figure 1:
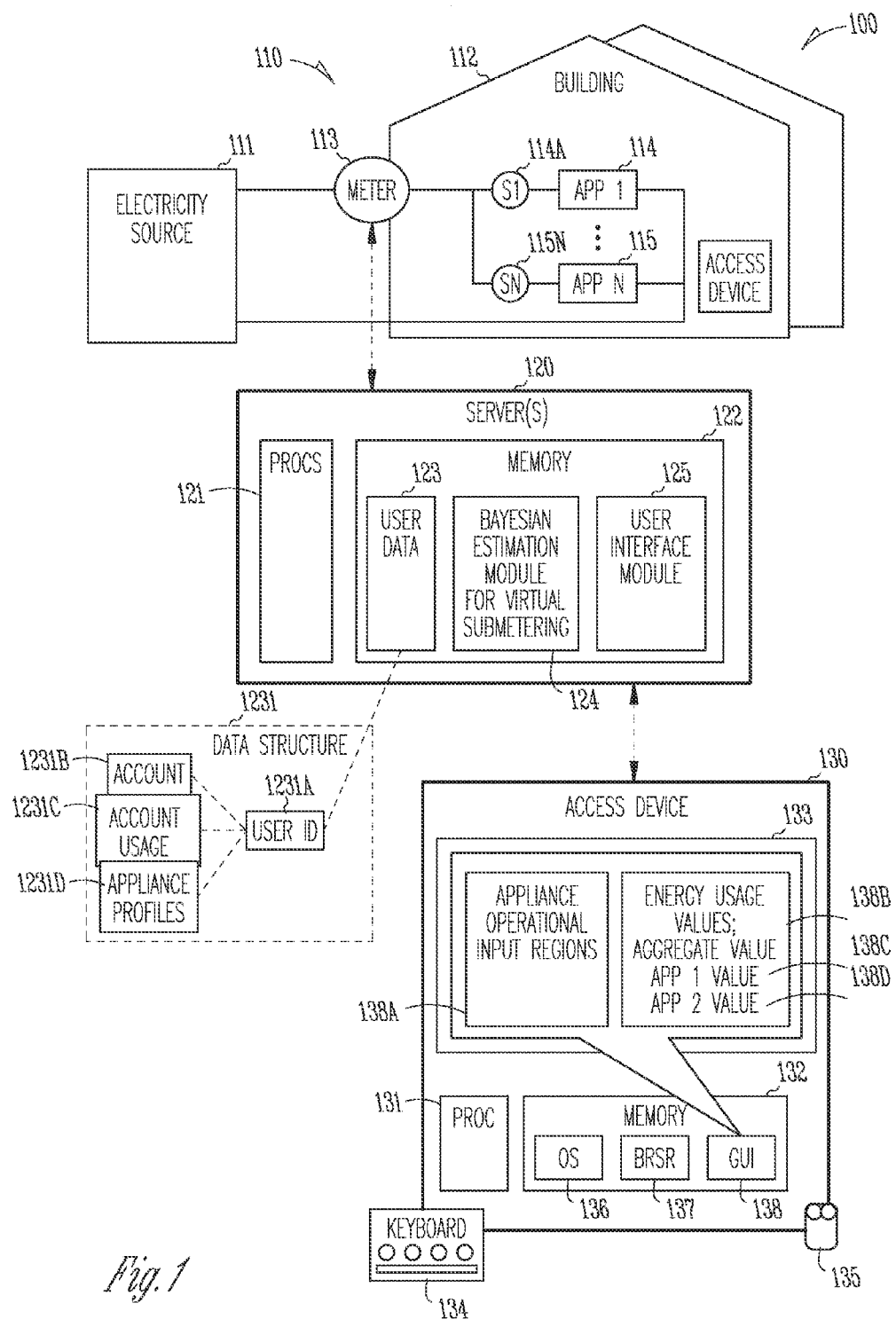
FIG. 1 is a block diagram of an exemplary virtual sub-metering system 100 corresponding to one or more embodiments of the present invention.

FIG. 1 shows an exemplary virtual sub-metering system 100. System 100 includes a building system 110, one or more web servers 120, and one or more access devices 130.

Exemplary Building System

Building system 110 includes an energy source 111, building 112, an energy meter 113, electrical appliances 114 and 115. Energy source 111, which takes the exemplary form of a local or remote electrical generator, supplies electricity to building 112, with the aggregate or cumulative energy consumed by building 112 is measured by energy meter 113, for example a digital electric meter. The exemplary system uses digital energy meter which measures wattage consumption. Present tariff meters do not have this facility. In such cases a digital energy meter is installed after the tariff meter. If a smart tariff meter is available, then it can be directly used for the purpose] Building 112, which is generally representative of one or more buildings, takes the exemplary form of a residential or commercial structure. Building 112 includes a set of N appliances, more generally electrical loads, devices or equipment, of which appliances 114 and 115 are generally representative. In one embodiment, appliance 114 is a water heater and appliance 115 is an air conditioner and have different energy load ratings, for example in Watts. In other embodiments, one or more of the appliances or electrical loads take the form of chillers, motors, compressors, lighting, or other industrial equipment or home appliances. The aggregate energy measurement of energy meter 113 therefore aggregates the individual usage of appliances 114 and 115. Appliances 114 and 115 are associated with respective on-off switches 114A and 115A, which may be operated automatically or manually. In commercial building scenario or industrial scenario, multiple energy meters are installed at different locations of the building or plant. The method described here can also take care of this scenario.

Exemplary Web Servers

Server 120, which receives load profile information and aggregate or cumulative energy usage data from energy meter 113, includes a processor module 121, a memory module 122, a user data module 123, a Bayesian estimation module 124, and a user interface module 125. (In some embodiments, processor module 121 and memory module 122 are incorporated within the electrical meter to allow for complete or partial local estimation of individual load consumption values.)

Processor module 121 includes one or more local or distributed processors, controllers, or virtual machines. In the exemplary embodiment, processor module 121 assumes any convenient or desirable form. In some embodiments, one or more of the processors are incorporated into servers.

Memory module 122, which takes the exemplary form of one or more electronic, magnetic, or optical data-storage devices, stores user data module 123, Bayesian estimation module 124, and user interface module 125.

In the exemplary embodiment, user data module 123 includes one or more sets of machine-readable and/or executable instructions for collecting and storing user account or subscriber data. To this end, module includes one or more data structures, of which data structure 1231 is representative. Data structure 1231 includes a unique identification portion 1231A, which is logically associated with one or more fields, such as fields 1231B, 1231C, and 1231D. Field 1231B includes a user account data, such as username and passwords, address or contact data (such as postal address, mobile telephone number and email address); field 1231C includes time stamped aggregate usage data from energy meter associated with a user. Field 1231D appliance profile information for one or more of appliances, such as appliances 114 and 115.

In the exemplary embodiment, the load profile information or data provides usage hours on a typical day including weekends and holidays, as well as the wattage rating of the load and type of the load, for example washing machine, hot water circuit, air conditioner etc. (The system also learns the actual consumption by monitoring the energy usage on a continuous basis.) In some embodiments, the user data module or server 120 is part of a meter data management system of a utility company; however, in other embodiments, the user data and/or the server are not controlled by the utility company but by a third-party entity on behalf of the owner or renter of building 112.

Bayesian module 124 includes one or more sets of machine-readable and/or executable instructions for receiving aggregated usage values from meter 113 (or from a meter data management system for a utility company that owns or controls meter 113) and for receiving appliance profile data from user data module 123, and determining individual appliance energy consumption (virtual submetering values) using a Bayesian estimator.

Dynamic Model of Building Power Consumption

More particularly, in formulating a dynamic model for its Bayesian estimator, the exemplary embodiment assumes a constant power rating for individual appliances (i.e., single mode of operation), and a unique power rating for each appliance (i.e., no two appliances have the same wattage.) For example, in one embodiment, a fan is rated at 60 Watts and a refrigerator is rated at 100 Watts). Additionally, the exemplary embodiment lets $x(t) \notin R^n$ be the appliance matrix representing the wattage consumptions of individual appliances, where n represents the number of appliances in the building. From the physical point of view each appliance has constant power rating. Also, the power consumption P between two sample points is assumed constant. This allows one to express the rate of change of power consumption as $$\frac{dP}{dt} = 0 \qquad (1)$$

The watt or energy meter reading y(t) is an aggregation of power consumption of multiple loads, and can be written as $$y(t) = \frac{dEg(t)}{dt} \quad Eg = Kwhr, y = \text{wattage} \qquad (2)$$

$$y(t) = \sum_{i=1}^{m} x_i(t) S_i(t)$$

where state $x_i(t)$ denotes the dynamic power or energy consumption of the i-th appliance; $S_i(t)$ denotes the switching state (0 or 1, which correspond respectively to on or off) of the i-th appliance. In state space form, the process and the measurement equations can be expressed as $$x(t+1) = H \cdot x(t) + w(t) \quad \omega(t) \sim N(0, Q)$$

$$y(t) = C_t x(t) + v(t) \quad \omega(t) \sim N(0, R) \qquad (3)$$

The observation matrix $C_t \notin R^{1 \times n}$ changes with time based on the underlying switching events in the environment. $C_t = [0\ 0\ \ldots\ 0]$ when all the appliances are switched off and $C_t = [1\ 1\ \ldots\ 1]$, when all the appliances are switched ON. Practically, the observation matrix $C_t$ would take a form in between the all-off and the all-on states depending on the underlying electrical activity in the building. The state transition matrix H is an identity matrix indicating the continued operation/dis-operation of the individual appliance. Multivariate measurements such as active power, reactive power, harmonic contents, phase current, voltage can be obtained using a smart meter. In such a scenario, the similar formulation can be used; however, one would modify the observation equation based on the measurements.

Exemplary Incorporation of Prior Appliance Information in Dynamic Model

With the dynamic model defined as in Eq. (3), the exemplary embodiment incorporates prior information about operation of the appliances. Exemplary forms of prior information include 1. Time of the day
2. Appliance Load Ratings
3. Appliance mode dependencies (ex: A dish washer set drying mode after hot water rinsing mode)
4. Dynamic appliance mode switching (switching with time)
5. User behaviors-User Lifecycle/Priority (User switches ON the dishwasher in the night)
6. Interdependency of appliances/Hierarchical structure
7. Weather Information (Heater is used in the winter based on ambient temperature
8. User Occupancy In formulating the estimator to incorporate prior appliance information, the exemplary embodiment defines the observed sequence of energy meter readings (for example in watts) up to a time s as $Y_s = \{y1, y2 \ldots ys\}$. Additionally, it assumes the initial conditions for state $x_t$ as $x_{t-1}^{t-1}$ and $P_{t-1}^{t-1}$ and initializes all the states to zero, when the energy meter reading is close to zero. Based on known initial conditions, it deduces the predictions of the state and the covariance matrix as $$x_t^{t-1} = Hx_{t-1}^{t-1}$$

$$P_t^{t-1} = HP_{t-1}^{t-1}H' + Q; \qquad (4)$$

Note that the event information is not included in the prediction step. After getting the new observation, readjusted to obtain the updated state along with the underlying event.

$$\begin{aligned} x_t^t &= E[x_t \mid Y_t] \\ &= E[E[x_t \mid Y_t, C_t] \mid Y_t] \\ &= E\left[\sum_{j=1}^{m} E[x_t \mid Y_t, I(C_t = C_j)] \,\bigg|\, Y_t\right] \end{aligned} \qquad (5)$$

I is the indicator function. Given—the new information and the event at time t one can update—the state using conventional Kalman filter updates; which can be given as $$\begin{aligned} x_t^t &= E\left[\sum_{j=1}^{m} E[x_{t,j}^{t-1} + K_{t,j}(y_t - x_t^{t-1})]I(C_t = C_j) \,\bigg|\, Y_t\right] \\ &= x_t^{t-1} + \sum_{j=1}^{m} K_{t,j}(y_t - x_t^{t-1})P(C_t = C_j \mid Y_t) \end{aligned} \qquad (6)$$

Where $K_{t,j}$ is the Kaman gain under different events [2].

In the similar lines one can prove the updated covariance matrix as $$\begin{aligned} P_t^t &= E[(x_t - x_t^t)(x_t - x_t^t)' \mid Y_t] \\ &= \sum_{j=1}^{m} P(C_t = C_j \mid Y_t)[I - K_{t,j}P_t^{t-1}] \end{aligned} \qquad (7)$$

The innovations or the new information due to the availability of the new observation is defined as the difference between the new observation and the predicted observation. Having considered the different event possibilities, while predicting, one will get different innovations. From Kalman filtering, the innovation sequence under different events can be given as $$\in_{t,j} = y_t - C_j x_t^{t-1} \; \forall j = 1, 2 \ldots m \qquad (8)$$

Considering the covariance of the innovation under different events:

$$\begin{aligned} \sum_{t,j} &= E[\in_{t,j} \in'_{t,j}] \\ &= E[(y_t - C_j x_t^{t-1})(y_t - C_j x_t^{t-1})'] \; \forall \, j = 1, 2 \ldots m \\ &= C_j' P_t^{t-1} C_j + R \end{aligned} \qquad (9)$$

Since $P_t^{t-1}$ is constant under different events, the innovation covariance under different events remains the same. Hence, $$\begin{aligned} K_{t,j} &= P_t^{t-1} C_j' \sum_{t,j}^{-1} \\ &= P_t^{t-1} C_j' [C_j P_t^{t-1} C_j' + R]^{-1} \end{aligned} \qquad (10)$$

Next, one obtains the switching probabilities of the observation matrix. These probabilities adjudicate the model under consideration. Below, we obtain the conditional probability of the occurrence of a particular event given the observation. The embodiment takes a "winner take all" approach while updating the state.

The updation equation (both state and state covariance) as given in equation 6 and 7 demands the knowledge of $P(C_t = C_j \mid Y_t)$. In this term, the exemplary embodiment incorporates the various prior information which will help in isolating the responsible events.

This section explicates the ways to incorporate the prior information for detecting the electrical switching events in the building. As explained earlier, various types of prior information are available and the exemplary embodiment provides the framework to incorporate the same. The event matrix $C_t$ is the event indicating the sequence of appliances operating at given time t. The event matrix is combination of multiple sub-events $A_1, A_2, \ldots A_k$ which constitutes the appropriate event matrix $C_t$. Below, we explain the methodology for incorporating the prior knowledge in the state estimation procedure.

Incorporation of Time of Day Information on Appliance Switching-Conditioning Over Time It is well known that certain types of appliances are used in certain time of the day. For example, lighting is mostly used in the night and dishwashers may be used certain time of the day. Such prior event probability can be generated by taking the end user usage profile, which indicates the probability of appliance being switched ON/OFF with time. In this section, we introduce the ways to incorporate this knowledge in the estimator. However in the forthcoming sections we introduce the ways to learn this prior information from the data. One amongst many possibilities, the user may indicate the likely usage of the appliance in the entire span of the day. This information can be converted into statistical terms. For example, the user may provide the likely usage in colloquial terms as [Likely, Don't Know Unlikely].

| Input from User | P(App State = ON@t) |
| --- | --- |
| Likely | 0.9 |
| Do not know | 0.5 |
| Unlikely | 0.1 |

Incorporation of this info is called "conditioning on time".

$$P(A_1(t) \mid Y_t) \alpha \overset{\text{Likelihood}}{P(Y_t \mid A_1(t))} * \overset{\text{prior probability}}{P(A_1(t))} \qquad (11)$$

The term $A_1(t)$ is a function of time. For example, probability of operation of lights is high in the night rather than in day time. Alternatively, probability of operation of cooking range is low in mid noon and high in morning and evening. These probabilities hence the probability density function (pdf) varies per user and geographical locations. Hence, the prior probability must be learned over time and then incorporated in the estimator.

Incorporation of Appliance Dependencies-Conditioning Over Space

In a home or buildings (or commercial), different appliances are interdependent on each other for their operation (or non-operation). Also, in other cases two appliances do not operate at a same time. For example, a heater and chiller do not work simultaneously. Similar appliance dependencies can be brought in and can be used for efficient submetering.

We call incorporation of these types of operational dependencies "conditioning over space" for a given time. The conditioning over space exploits the sequence of appliance usage, which can be an input from the user or can be learned using an observer. Let us consider the spatial distribution of an event $E=[A_1\ A_2\ A_3]$ at a given time t.

$$P(E@t|Y_t) = P(A_1=ON@t, A_2=ON@t, A_3=ON@t|Y_t) \quad (12)$$

$$= P(A_1=ON@t|Y_t)P$$

$$(A_2=ON@t|A_1=ON@tY_t)*$$

$$P(A_3=ON@t|A_1=ON@t, A_2=ON@t, Y_t)$$

$$= P(A_2=ON@t|Y_t)P$$

$$(A_1=ON@t|A_2=ON@t, Y_t)*$$

$$P(A_3=ON@t|A_1=ON@t, A_2=ON@t, Y_t)$$

$$= P(A_3=ON@t|Y_t)P$$

$$(A_1=ON@t|A_3=ON@t, Y_t)*$$

$$P(A_2=ON@t|A_1=ON@t, A_3=ON@t, Y_t)$$

Modeling Hierarchical Dependencies

The exemplary embodiment also incorporates prior information regarding hierarchical dependencies of appliance operation. For example, assume a situation, wherein appliance $A_1$ operates independently and appliance $A_2$ operates only when $A_1$ operates. The above situation can be modeled as follows:

$$P(A_2(t)|Y_t) = \int_{-\infty}^{\infty} P(A_2(t), A_1(t)|Y_t) dA_1(t) \quad (13)$$

$$= P(A_1(t)=ON|Y_t)P(A_2(t)|A_1(t)=ON) +$$

$$P(A_1(t)=OFF|Y_t)P(A_2(t)|A_1(t)=OFF)$$

The term $P(A_2(t)|A_1(t)=ON)$ and $P(A_2(t)|A_1(t)=OFF)$ represent the hierarchical structure and appliance dependencies.

Incorporation of Short-Time Switching Dynamics

In a home and building scenario, it is very common to have appliances running in multiple modes and drawing comparable powers. Hence, it is extremely difficult to estimate the status of multiple appliances drawing similar power. In this regard we make use of the short-time dynamics of the appliances along with the above mentioned prior information.

$$P(A_t=e_i|Y_t) =$$
$$P(A_t=e_i|Y_t, Y_{t-1}) \ldots \text{where } Y_{t-1} \text{ Information till } (t-1)$$
$$Y_t = \text{sensor measurement at}$$
$$t = \frac{P(A_t=e_i, Y_t, Y_{t-1})}{P(Y_t, Y_{t-1})}$$
$$= \frac{P(A_{t-1})P(A_t=e_i|Y_{t-1})P(Y_t|A_t=e_i, Y_{t-1})}{P(Y_{t-1})P(Y_t|Y_{t-1})}$$

$$P(A_t=e_i|Y_t) \propto P(A_t=e_i|Y_{t-1})P(Y_t|A_t=e_i) \quad (14)$$

$$P(A_t=e_i|Y_t) = \sum_{ej} P(A_t=e_i, A_{t-1}=e_j|Y_{t-1}) \quad (15)$$

$$= \sum_{ej} P(A_t+e_i|A_{t-1}=e_j)P(A_{t-1}=e_j|Y_{t-1})$$

where $P(A_t=e_i|A_{t-1}=e_j)$ is one step *markov* transition density and $P(A_t=e_i|Y_{t-1})$ is the prior probability of appliance state at $(t-1)$ Note that $P(A_t=e_i|A_{t-1}=e_j)$ measure is closer to unity in case of i=j; which signifies that, probability of appliance being In the similar lines, other prior information such as "Operational characteristics", "Dynamic appliance mode switching" and seasonal effects can be incorporated. However, the transient analysis is different from the above analysis and addressed in forthcoming sections.

$$P(C_t=C_j|Y_t) = P(C_t=C_j|y_tY_{t-1}) \quad (16)$$

$$= \frac{P(C_t=C_j|y_tY_{t-1})}{P(y_t, Y_{t-1}))}$$

$$= \frac{P(Y_{t-1})P(C_t=C_j|Y_{t-1})P(y_t|C_t=C_j, Y_{t-1})}{P(Y_{t-1})P(y_t|Y_{t-1})}$$

$$= \frac{P(C_t=C_j|Y_{t-1})P(y_t|C_t=C_j, Y_{t-1})}{P(y_t|Y_{t-1})}$$

$$= \frac{P(C_t=C_j|Y_{t-1})P(y_t|C_t=C_j)}{\sum_{k=1}^{m} P(C_t=C_k|Y_{t-1})P(y_t|C_t=C_k)}$$

Now consider the term $P(C_t=C_j|Y_{t-1})$ $$P(C_t=C_j|Y_{t-1}) = \sum_{k=1}^{m} P(C_t=C_j, C_{t-1}=C_k|Y_{t-1}) \quad (17)$$

$$\sum_{k=1}^{m} P(C_t=C_j|C_{t-1}=C_k)$$

$$P(C_{t-1}=C_k|Y_{t-1})$$

In the above expression $P(C_t=C_j|C_{t-1}=C_k)$ is the transition probability of occurrence of event $C_j$ at time t, given that event $C_k$ has happened at t−1.

Now consider the term $P(y_t|C_t=C_j, Y_{t-1})$. The difficulty in extending the approach here to the Markov case is the dependence among the $y_t$, which makes it necessary to enumerate over all possible histories to derive the filtering equations. To evaluate $P(Ct=C_j|Y_{t-1})$, consider the observation matrix sequence $C_1=C_{j1}$, $C_2=C_{j2}$ $C_3=C_{j3}$ ... $C_{t-1}=C_{jt-1}$, for j=1, 2, ..., m and i=1, 2, ..., (t−1), which specifies the specific set of measurement matrices through the past; Lets represent this event (or series of events through time) as $C_{t-1}=C_t$. Because $m^{t-1}$ possible outcomes exist for $G_1, C_2 \ldots C_{t-1}$, we have $$P(y_t|C_t=C_j, Y_{t-1}) = \sum_{l=1}^{m^{t-1}} P(C_{t-1}=C_l|Y_{t-1})P \quad (18)$$

$$(y_t|Y_{t-1}, C_t=C_j, C_{i-1}=C_l)$$

$$= \sum_{l=1}^{m^{t-1}} a(l) N\left(y_t|\mu_{t,j}, \sum_{t,j}(l)\right),$$

$$j=1, 2, \ldots, m$$

The notation $N(y_t|\mu_{t,j}(l), \Sigma_{t,j}(l))$ indicates the normal densities with the parameters $\mu_{t,j}(l), \Sigma_{t,j}(l)$. Hence, the conditional likelihood is a mixture of Gaussians and number of Gaussians depend on the time stamp and the number of possible events. These parameters can be given as:

$$\mu_{t,j}(l) = x_t^{t-1}(l) = E[x_t | Y_{t-1}, C_{t-1} = C_j]$$

$$\Sigma_{t,j}(l) = P_t^{t-1} + R$$

The evaluation of the above expression is highly expensive since at each time stamp, the number of possible events grow exponentially. One of the ways of overcoming this problem is by discarding the improbable events or considering only the most likely events. In this way, one can trim the sample paths and then calculate $P(Y_t|C_t=C_j, Y_{t-1})$. Another alternative is to use the closest normal distribution (using Kulback-Leiber distance). In this case, the approximation leads to choosing normal distribution with the same mean and variance associated with the $P(Y_t|C_t=C_j, Y_{t-1})$. i.e., we approximate $P(Y_t|C_t=C_j, Y_{t-1})$ by a distribution with mean $x_t^{t-1}$ and variance $(CP_t^{t-1}C'+R)$.

In addition to user data module 123 and Bayesian estimation module 124, memory 122 stores user-interface module 125.

In the exemplary embodiment, user interface module 125 includes machine readable and/or executable instruction sets for wholly or partly defining web-based or browser-compatible user interfaces for enabling users to input appliance usage profiles and to access the individual energy usages determined for appliances by Bayesian estimation module 124, via access device 130.

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Access device 130 can be located within or without building 112. Specifically, access device 130 includes a processor module 131 one or more processors (or processing circuits) 131, a memory 132, a display/loudspeaker 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering on display 133, GUI 138 presents data in association with one or more interactive control features (or user-interface elements). The exemplary embodiment defines one or more portions of interface 138 using applets or other programmable objects or structures from server 120. In particular, GUI 138 includes an appliance input region 138A and an energy usage reporting region 138B, which includes input fields or regions enabling a user to define and submit load profile of various residential or business appliances, as previously discussed. Energy usage reporting region 138B displays aggregate usage values from energy meter 113 as well as Bayesian estimated virtual submeter reading values determined by Bayesian estimation module 124 for appliances 114 and 115 within building 112.

Exemplary Method(s) of Operation

Figure 2:
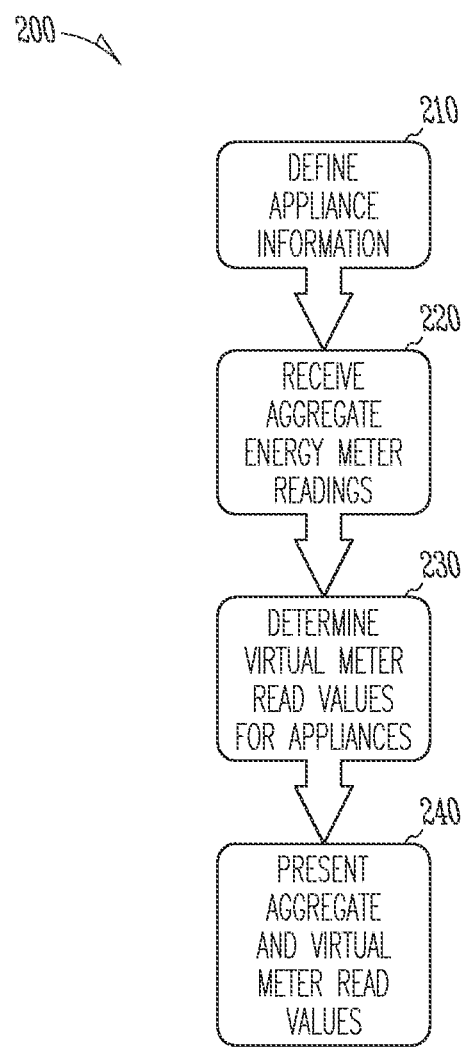
FIG. 2 is a flow chart of an exemplary method of operating a virtual sub-metering system, corresponding to one or more embodiments of the present invention.

FIG. 2 shows a flow chart 200 of one or more exemplary methods of operating a system, such as system 100. Flow chart 200 includes blocks 210-299, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with defining appliance information for two or more appliances of a building. In the exemplary embodiment, this entails defining the load rating and typical operational periods for the appliances, as described above, using access device 130 and its graphical user interface 138 in FIG. 1. In some embodiments, the graphical user interface prevents users from inputting two appliances with the same load rating value or alternatively prevents users from indicating that two appliances with the same load rating value are operating simultaneously, because of difficulties of distinguishing them in an aggregated energy meter reading. However, some embodiment may leverage one or more electrical traits of the loads, such as reactive load, as a distinguishing feature. Still other embodiments may allow two appliances to be designated with same load rates and with overlapping on times, but simply treat them as a single combined load in further analysis. Once the appliance information has been input, execution proceeds to block 220.

Block 220 entails receiving one or more aggregate energy meter readings. In the exemplary embodiment, this entails receiving energy meter readings from an electric power meter attached or otherwise associated with a building, for example meter 113 and building 112. In some embodiments, the meter readings are provided via a meter data management system for an electric utility. Exemplary execution continues at block 230.

Block 230 entails disaggregating at least one of the aggregate energy meter readings into two or more virtual submeter readings based on the input appliance information from block 210. In the exemplary embodiment, this entails uses of Bayesian estimation module 124 in FIG. 1. Execution proceeds to block 240.

Block 240 entails presenting the virtual sub-meter readings to a user via a display device. To this end, the exemplary embodiment displays virtual sub-meter readings for each of the input appliances to the user via graphical user interface, such as interface 138, on an access device, such as access device 130.

Exemplary Automatic Configuration of Virtual Submeters

This section describes a method for estimating and learning the load parameters, particularly average power rating (in Watts) and variance of the individual loads as input to the virtual submeter module. To distinguish the different loads, we assume that there is ΔW difference in power rating between two distinct loads. Also, to avoid the outliers, the exemplary embodiment use a tunable belief probability. When the belief probability exceeds certain threshold, the associated load signature is considered as pertaining to particular load. The method can also exploit the temporal and spatial switching dependencies. The pseudo code of the algorithm is given below. Let ΔW be the tunable parameter which distinguishes the different loads based on the demanded power. Let $P_B$ be the minimum belief probability. Let $N_{max}$ be the maximum number of set loads $N_{max} > N$, where N is the actual number of loads present, which is a unknown constant.

---

1. Set ΔW, $P_B$, $N_{new} = N_{max}$
2. Set $N = N_{new}$
3. Filter the raw-power data using a low-pass filter
4. Cluster the time series with $N = N_{max}$ cluster centers. Let $N_{old} = N$
5. Estimate the belief frequency of existence of individual cluster.
6. Prune the number of clusters based on: a) ΔW threshold; b) Belief probability threshold. Let $N_{new}$ be the consolidated clusters.
7. if $N_{new} = N_{old}$, then Number of load centers = $N_{new}$ and exit loop; else go to step 2

---

Exemplary Change Detection and Reconfiguration

It is common to add or remove a system or appliance to or from a building, such as building 112 in system 100. Whenever, such changes happen, models may need to be reconfigured for reflecting the changes. In this section, we develop a detection methodology which can detect the change in environment and assist the configuration algorithm to understand and account for the changed environment.

Consider the innovation sequence as defined in eqn 8. The mean and covariance of the same can be given by:

$$\in_{t,j} y_t - C_j x_t^{t-1} \forall j=1,2 \ldots m$$

$$E[x_{t,j}] = 0$$

$$\Sigma_{t,j} = C_j' P_t^{t-1} C_j + R \quad (19)$$

The mean of the innovation sequence is the measure of the inferencing accuracy. In this case, at least one instance (out of m events) would have zero mean process. In each time stamp t, we chose those innovation instances which have close to zero mean and collect the same. We call this as $\{r(t)\}$ or residue sequence. We then run a hypothesis testing based on Neyman-Pearson Criterion. A confidence measure is built on the detected instances and a mechanism is built, when the confidence variable reaches a set threshold. The pseudo-code for the same can be given as follows:

---

1. Initialize confidence variable c
2. Generate residual sequence $\{r(t)\}$
3. Perform the hypothesis testing
4. Update c
5. if c > thr, initiate automated configuration algorithm, else go to 2

---

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. Apparatus for estimating energy usage of two or more electrical devices, the apparatus comprising:
   computer processor means for receiving usage profile data for at least first and second electrical devices, with the first and second electrical devices having different load ratings;
   computer processor means, responsive to an aggregate energy usage value measured by an electric meter and based at least on energy usage of the first and second devices, and responsive to the usage profile data for the first and second electrical devices, for estimating electrical usage of each of the first and second devices, wherein the means includes a Bayesian estimator; and
   a graphical user interface for inputting the usage profile data for the first and second electrical devices, wherein the interface is configured to receive respective first and second load ratings for the first and second electrical devices and prevents input of first and second load ratings that are equal.

2. The apparatus of claim 1, wherein the usage profile data for at least first and second electrical devices defines respective first and second time periods of operation of the first and second devices.

3. The apparatus of claim 2, wherein the respective first and second time periods are associated with at least one respective probability value.

4. The apparatus of claim 1, wherein the graphical user interface is configured to receive respective first and second time periods of operation of the first and second devices in association with respective first and second probability values.

5. The apparatus of claim 1, wherein the computer processor means for estimating electrical usage of the each of the first and second devices includes a server.

6. The apparatus of claim 1, further comprising a single digital electric meter coupled to the first and second electrical devices for providing the aggregate energy usage value.

7. The apparatus of claim 1, wherein the computer processor means for estimating electrical usage of each of the first and second devices estimates electrical usage based on device mode dependencies, device operational interdependency, and one or more of:
   time of the day;
   device load ratings;
   dynamic device mode switching;
   user device-usage patterns;
   weather information; and
   user occupancy information.

8. A system comprising:
   first and second electrical loads having respective first and second different load ratings, the first and second electrical loads comprising household and business electrical appliances;
   an electric meter electrically coupled to the first and second electrical loads for providing an aggregate energy usage value based in part on a sum of first and second energy usage values for the respective first and second electrical loads;
   a server including a processor and memory, the memory including machine-executable instructions for determining respective first and second estimates of the first and second energy usage values based on the aggregate energy usage value and respective first and second sets of load profile information for the first and second electrical loads;

a display, responsive to the server, for displaying the first and second estimates of the first and second energy usage values; and a graphical user interface for inputting the first and second sets of load profile information, wherein the interface is configured to receive respective first and second load ratings for the first and second electrical devices and prevents input of first and second load ratings that are equal.

9. The system of claim 8, wherein the first and second sets of load profile information include respective first and second times periods of operation of the first and second appliances.

10. The system of claim 9, wherein the respective first and second time periods are associated with at least one respective probability value.

11. The system of claim 8, wherein the graphical user interface is configured to receive respective first and second time periods of operation of the first and second electrical loads in association with respective first and second probability values.

12. A method implemented using at least one processor coupled to a memory, the method comprising:

receiving an aggregate energy usage reading associated with an electric meter coupled to the first and second electrical devices having different load ratings, with the aggregate energy usage reading based at least in part on respective first and second energy usage values for the first and second electrical devices;

estimating respective first and second energy usage values for the first and second devices, based on the aggregate energy usage read and respective first and second sets of profile information for the first and second electrical devices; and receiving user input defining the first and second sets of profile information, wherein the profile information includes respective first and second load ratings for the first and second electrical devices, and preventing input of first and second load ratings that are equal.

13. The method of claim 12, further comprising:
storing in the memory the first and second sets of profile information prior to receiving the aggregate energy usage reading.

14. The method of claim 12, wherein estimating respective first and second energy usage values for the second usage profile data for at least first and second electrical devices, includes performing a Bayesian estimation of the first and second energy usage values.

15. The method of claim 12, wherein receiving user input defining the first and second sets of profile information includes receiving input defining respective first and second time periods of operation of the first and second devices in association with respective first and second probability values.

* * * * *